(12) United States Patent
Bilski

(10) Patent No.: US 7,931,817 B2
(45) Date of Patent: Apr. 26, 2011

(54) ADDITIVE DISPENSING DEVICE AND A THERMALLY ACTIVATED ADDITIVE DISPENSING FILTER HAVING THE ADDITIVE DISPENSING DEVICE

(75) Inventor: Gerard W. Bilski, Perrysburg, OH (US)

(73) Assignee: Honeywell International Inc., Morristown, NJ (US)

( * ) Notice: Subject to any disclaimer, the term of this patent is extended or adjusted under 35 U.S.C. 154(b) by 567 days.

(21) Appl. No.: 12/032,241

(22) Filed: Feb. 15, 2008

(65) Prior Publication Data

US 2009/0206024 A1 Aug. 20, 2009

(51) Int. Cl.
*B01D 37/00* (2006.01)

(52) U.S. Cl. ............ 210/767; 137/2; 137/468; 137/512; 222/1; 222/92; 222/94; 222/95; 222/129; 222/146.1; 222/189.06; 222/251; 222/372; 222/373; 210/136; 210/184; 210/209; 210/774

(58) Field of Classification Search .................. 210/117, 210/136, 149, 175, 184, 198.1, 199, 205, 210/206, 209, 418, 419, 435, 767, 774; 184/1.5, 184/6.21–6.24; 222/1, 146.1, 146.2, 146.6, 222/251, 92, 94–96, 129, 372, 373, 189.06; 137/2, 468, 512
See application file for complete search history.

(56) References Cited

U.S. PATENT DOCUMENTS

| | | | |
|---|---|---|---|
| 2,262,526 A | 11/1941 | Fairlie et al. | |
| 2,310,305 A | 2/1943 | Miller et al. | |
| 2,618,586 A | 11/1952 | Hendel | |
| 2,809,772 A * | 10/1957 | Weisz | 222/397 |
| 3,336,223 A | 8/1967 | Kneeland | |
| 4,075,097 A | 2/1978 | Paul | |
| 4,075,098 A | 2/1978 | Paul et al. | |
| 4,113,606 A | 9/1978 | Mulaskey | |

(Continued)

FOREIGN PATENT DOCUMENTS

DE 157197 A1 10/1982

(Continued)

OTHER PUBLICATIONS

International Search Report for PCT/US2004/002144 dated Jun. 3, 2004.

(Continued)

*Primary Examiner* — Joseph W Drodge
(74) *Attorney, Agent, or Firm* — Cantor Colburn LLP

(57) ABSTRACT

An additive dispensing device is provided. The additive dispensing device includes a reservoir configured to contain a supply of an additive. The reservoir is in fluid communication with a dispensing chamber of a metering valve device by a first one-way valve. The metering valve device is configured to dispense a portion of the additive from the dispensing chamber into a housing by a second one-way valve. The additive dispensing device further includes a thermal expanding member disposed in the dispensing chamber. The thermal expanding member is configured to expand and contract between expanded and contracted positions, respectively, in response to temperature. The thermal expanding member decreases a pressure in the dispensing chamber as the thermal expanding member moves toward the contracted position, such that additive is drawn from the reservoir into the dispensing chamber through the first one-way valve. The thermal expanding member increases the pressure in the dispensing chamber as the thermal expanding member moves toward the expanded position, such that additive previously drawn from the reservoir chamber into the dispensing chamber is dispensed through the second one-way valve.

19 Claims, 4 Drawing Sheets

U.S. PATENT DOCUMENTS

| | | | |
|---|---|---|---|
| 4,144,166 A | 3/1979 | DeJovine | |
| 4,144,169 A | 3/1979 | Grueschow | |
| 4,168,225 A | 9/1979 | Jackson | |
| 4,181,611 A * | 1/1980 | Rubenstein et al. | 210/149 |
| 4,211,639 A | 7/1980 | Jackson | |
| 4,265,748 A | 5/1981 | Villani et al. | |
| 4,523,532 A | 6/1985 | Moriarty et al. | |
| 4,557,829 A | 12/1985 | Fields | |
| 4,660,645 A | 4/1987 | Newlove et al. | |
| 4,751,901 A | 6/1988 | Moor | |
| 4,755,289 A | 7/1988 | Villani | |
| 4,783,271 A * | 11/1988 | Silverwater | 210/742 |
| 4,886,599 A | 12/1989 | Bachmann et al. | |
| 4,888,122 A | 12/1989 | McCready | |
| 4,895,640 A | 1/1990 | Jackson | |
| 4,902,408 A | 2/1990 | Reichert et al. | |
| 4,906,389 A | 3/1990 | Brownawell et al. | |
| 5,032,259 A | 7/1991 | He et al. | |
| 5,042,617 A | 8/1991 | Brownawell et al. | |
| 5,057,368 A | 10/1991 | Largman et al. | |
| 5,069,799 A | 12/1991 | Brownawell et al. | |
| 5,069,970 A | 12/1991 | Largman et al. | |
| 5,094,747 A | 3/1992 | Johnson | |
| 5,199,978 A | 4/1993 | Poirier et al. | |
| 5,209,842 A | 5/1993 | Moor | |
| 5,225,081 A | 7/1993 | Brownawell | |
| 5,472,875 A | 12/1995 | Monticello | |
| 5,478,463 A | 12/1995 | Brownawell et al. | |
| 5,527,452 A | 6/1996 | Grigoriev et al. | |
| 5,552,040 A | 9/1996 | Baehler et al. | |
| 5,554,699 A | 9/1996 | Layer et al. | |
| 5,591,330 A | 1/1997 | Lefebvre | |
| 5,704,966 A | 1/1998 | Rohrbach et al. | |
| 5,713,971 A | 2/1998 | Rohrbach et al. | |
| 5,718,258 A | 2/1998 | Lefebvre et al. | |
| 5,725,031 A | 3/1998 | Bilski et al. | |
| 5,741,433 A | 4/1998 | Mitchell et al. | |
| 5,744,236 A | 4/1998 | Rohrbach et al. | |
| 5,759,394 A | 6/1998 | Rohrbach et al. | |
| 5,772,873 A | 6/1998 | Hudgens et al. | |
| 5,891,221 A | 4/1999 | Rohrbach et al. | |
| 5,900,153 A | 5/1999 | Sanford | |
| 5,902,384 A | 5/1999 | Rohrbach et al. | |
| 5,942,323 A | 8/1999 | England | |
| 5,948,248 A | 9/1999 | Brown | |
| 5,951,744 A | 9/1999 | Rohrbach et al. | |
| 6,004,381 A | 12/1999 | Rohrbach et al. | |
| 6,045,692 A | 4/2000 | Bilski et al. | |
| 6,048,614 A | 4/2000 | Rohrbach et al. | |
| 6,117,802 A | 9/2000 | Rohrbach et al. | |
| 6,126,823 A | 10/2000 | Soderlund et al. | |
| 6,127,036 A | 10/2000 | Xue et al. | |
| 6,129,835 A | 10/2000 | Lesieur et al. | |
| 6,235,519 B1 | 5/2001 | Wang et al. | |
| 6,238,554 B1 | 5/2001 | Martin, Jr. et al. | |
| RE37,369 E | 9/2001 | Hudgens et al. | |
| 6,379,564 B1 | 4/2002 | Rohrbach et al. | |
| 6,639,034 B2 | 10/2003 | Sivik et al. | |
| 6,743,759 B2 | 6/2004 | Stunkel et al. | |
| 6,774,091 B2 | 8/2004 | Dituro et al. | |
| 6,843,916 B2 | 1/2005 | Burrington et al. | |
| 2002/0001447 A1 | 1/2002 | Tei et al. | |
| 2002/0002118 A1 | 1/2002 | Brandt | |
| 2002/0136936 A1 | 9/2002 | Grieve et al. | |
| 2003/0111398 A1 | 6/2003 | Eilers et al. | |
| 2003/0119682 A1 | 6/2003 | Saini et al. | |
| 2003/0158501 A1 | 8/2003 | Uchida et al. | |
| 2004/0079589 A1* | 4/2004 | Schneider | 184/1.5 |
| 2004/0102335 A1 | 5/2004 | Carrick et al. | |
| 2005/0040092 A1 | 2/2005 | Eilers et al. | |
| 2006/0254986 A1* | 11/2006 | Hanson et al. | 210/739 |
| 2008/0099407 A1* | 5/2008 | Eilers et al. | 210/749 |
| 2009/0050547 A1* | 2/2009 | Hsu | 210/133 |

FOREIGN PATENT DOCUMENTS

| | | |
|---|---|---|
| DE | 4200376 A1 | 7/1993 |
| EP | 0078237 A1 | 5/1983 |
| EP | 0416905 A2 | 3/1991 |
| EP | 0416908 A2 | 3/1991 |
| EP | 1061251 A2 | 12/2000 |
| EP | 1061251 A3 | 6/2001 |
| FR | 51254 E | 2/1942 |
| FR | 2330856 A | 6/1977 |
| GB | 203354 A | 9/1923 |
| GB | 904480 A | 8/1962 |
| JP | 9141011 A | 6/1997 |
| RU | 1776423 A1 | 11/1992 |
| SU | 572072 A1 | 4/1980 |
| WO | 9411556 A | 5/1994 |
| WO | 0162871 A1 | 8/2001 |
| WO | 0185300 A2 | 11/2001 |
| WO | 02096534 A1 | 12/2002 |

OTHER PUBLICATIONS

Written Opinion of the International Searching Authority for PCT/US2004/002144 dated Jun. 3, 2004.

* cited by examiner

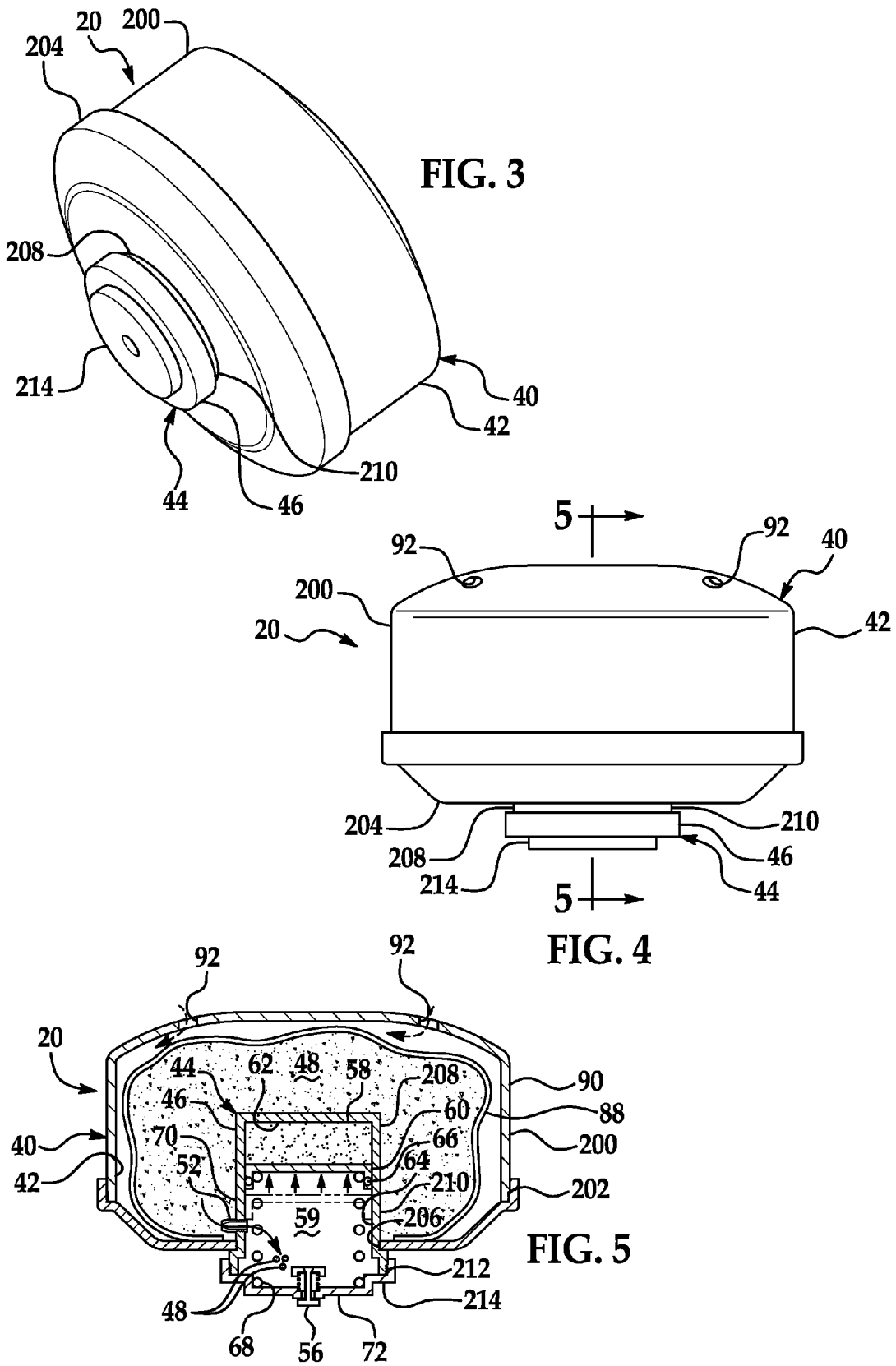

ADDITIVE DISPENSING DEVICE AND A THERMALLY ACTIVATED ADDITIVE DISPENSING FILTER HAVING THE ADDITIVE DISPENSING DEVICE

BACKGROUND OF THE INVENTION

The present invention relates to a filter for an internal combustion engine, and more particularly to a filter having an additive dispensing device that dispenses additive into a motor fluid in response to changes in temperature of the motor fluid, such as when the engine is turned on.

Motor oils have detergent or dispersant additives configured to suspend minute particles of soot in the oil, such that the oil carries the soot particles to the filter for removal from the oil. The soot is produced from the incomplete combustion of fossil fuel, which if left in the engine can lead to the formation of sludge and acids. The detergents are particularly beneficial for diesel engines, which are commonly known for producing significant amounts of soot. Other known beneficial additives are basic conditioners, corrosion inhibitors, metal deactivators, antioxidants, friction modifiers, oil stabilizers, pour point depressants, viscosity index improvers, anti-wear agents, extreme pressure additives, alkaline additives, and combinations of the above.

The additives undergo thermal and mechanical degradation. For example, engine heat generated by a significant amount of stop-and-go driving breaks down the additives. Further, the oil eventually becomes so saturated with soot particles that the additives become depleted and cannot carry any more soot in the oil. In both examples, the engine may become unprotected from the formation of sludge and other related problems.

Accordingly, it is desirable to provide an additive dispensing device that is configured to regularly dispense additive into a motor fluid over a period of time, such that the device prolongs the useful life of the fluid. It is further desirable to provide a thermally activated additive dispensing filter having an additive dispensing device that removes soot particles from motor oil over a longer period of time, as compared with conventional filters.

BRIEF DESCRIPTION OF THE INVENTION

In accordance with an exemplary embodiment of the present invention, an additive dispensing device is provided. The additive dispensing device includes a reservoir configured to contain a supply of an additive. The reservoir is in fluid communication with a dispensing chamber of a metering valve device by a first one-way valve. The metering valve device is configured to dispense a portion of the additive from the dispensing chamber into a housing by a second one-way valve. The additive dispensing device further includes a thermal expanding member disposed in the dispensing chamber. The thermal expanding member is configured to expand and contract between an expanded position and a contracted position, respectively, in response to temperature. The thermal expanding member decreases a pressure in the dispensing chamber as the thermal expanding member moves from the expanded position toward the contracted position, such that additive is drawn from the reservoir into the dispensing chamber through the first one-way valve. The thermal expanding member increases the pressure in the dispensing chamber as the thermal expanding member moves from the contracted position towards the expanded position, such that additive previously drawn from the reservoir chamber into the dispensing chamber is dispensed through the second one-way valve.

In accordance with another non-limiting exemplary embodiment of the present invention, a thermally activated additive dispensing filter is provided. The filter includes a housing having an inlet opening and an outlet opening. The housing further has a flow path extending between the inlet and outlet openings. The flow path is configured to pass a fluid therethrough. The filter further includes a filtration media located within the flow path such that a fluid in the flow path must pass through the filtration media. The filter further includes an additive dispensing device located inside the housing. The additive dispensing device has a reservoir configured to contain a supply of an additive. The reservoir is in fluid communication with a dispensing chamber of a metering valve device by a first one-way valve. The metering valve device is configured to dispense a portion of the additive from the dispensing chamber into the housing by a second one-way valve. The filter further includes a thermal expanding member disposed in the dispensing chamber. The thermal expanding member is configured to expand and contract between an expanded position and a contracted position, respectively, in response to temperature. The thermal expanding member decreases a pressure in the dispensing chamber as the thermal expanding member moves from the expanded position toward the contracted position, such that a portion of the additive is drawn from the reservoir into the dispensing chamber through the first one-way valve. The thermal expanding member increases the pressure in the dispensing chamber as the thermal expanding member moves from the contracted position toward the expanded position, such that additive previously drawn from the reservoir chamber into the dispensing chamber is dispensed through the second one-way valve.

Also disclosed herein is a method of dispersing an additive into a liquid filter, the comprising: drawing a first amount of additive into a dispensing chamber through a first one way valve by contracting a thermally expanding member, from an expanded position to a contracted position; and dispensing the first amount of additive from the dispensing chamber through a second one way valve by expanding the thermally expanding member from the contracted position to the expanded position by exposing the thermally expanding member to a fluid having a temperature higher than a temperature that causes the thermally expanding member to be in the contracted position.

BRIEF DESCRIPTION OF THE DRAWINGS

FIG. 3 is a perspective view of the additive dispensing device of FIG. 2;

FIG. 4 is a side plan view of the additive dispensing device of FIG. 3;

FIG. 5 is a cross-sectional view of the additive dispensing device, taken along line 5-5 in FIG. 4, illustrating a thermal expanding member being moved toward a contracted position such that a negative pressure differential is produced for drawing a portion of additive from a reservoir through a first one-way valve into a metering valve device;

DETAILED DESCRIPTION OF EXEMPLARY EMBODIMENTS

Figure 1:
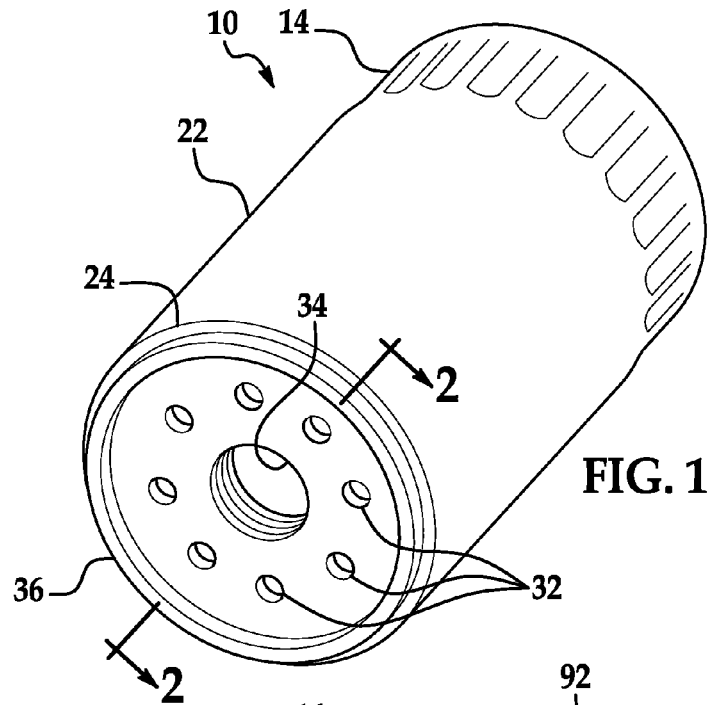
FIG. 1 is a perspective view of a thermally activated additive dispensing filter having an additive dispensing device, in accordance with an exemplary embodiment of the present invention.
Figure 2:
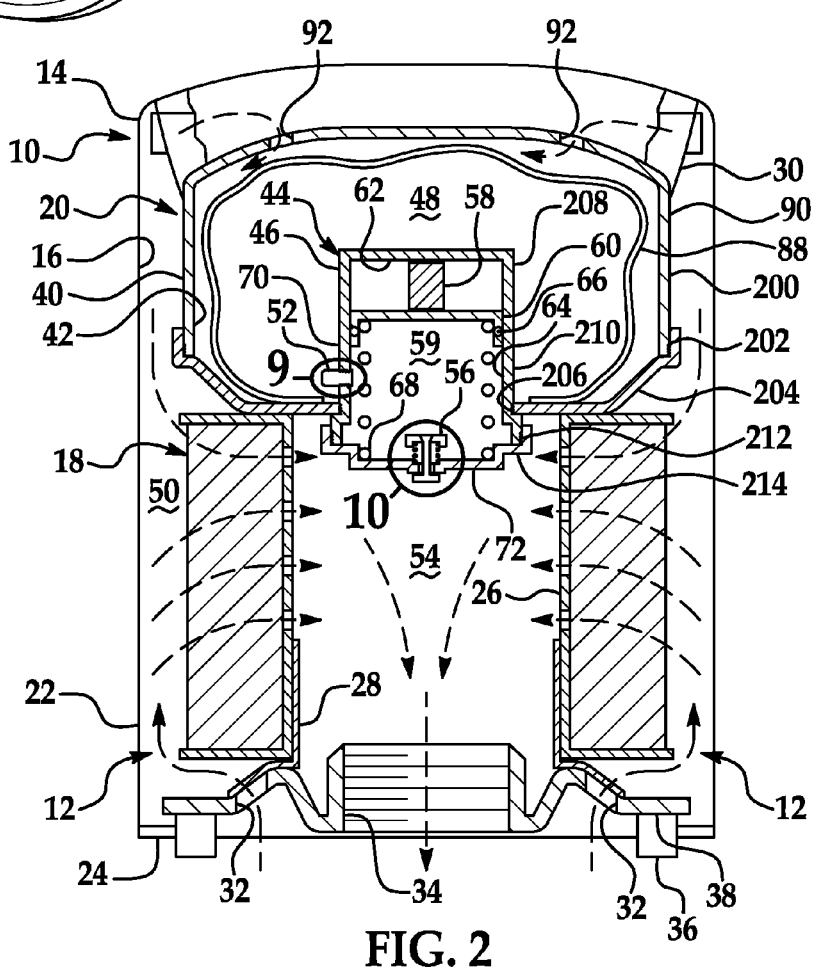
FIG. 2 is a cross-sectional view of the filter of FIG. 1, as taken along line 2-2.
Figure 6:
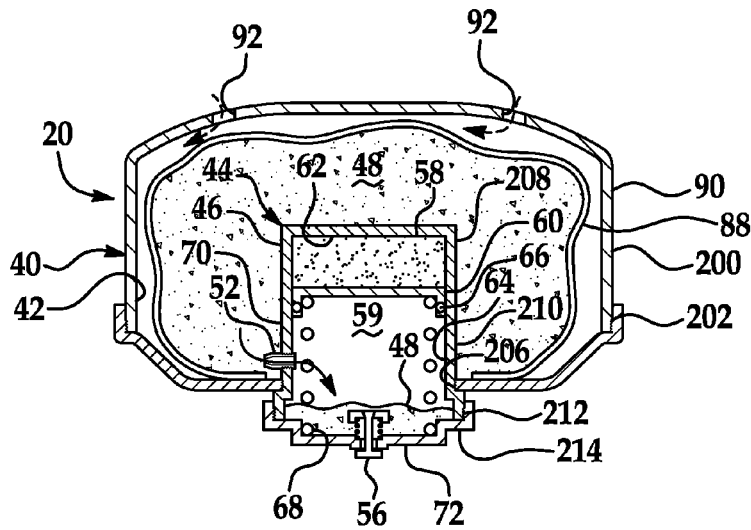
FIG. 6 is a cross-sectional view of the additive dispensing device of FIG. 5, illustrating the first one-way valve being moved toward a closed position.
Figure 7:
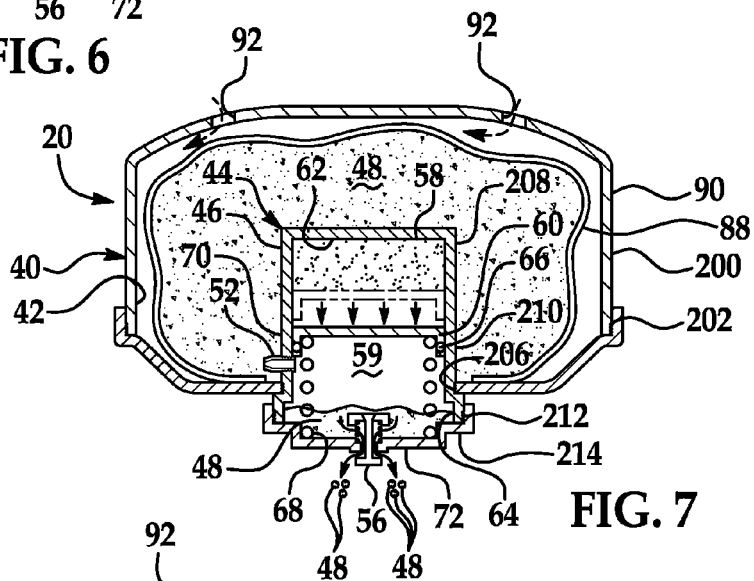
FIG. 7 is a cross-sectional view of the additive dispensing device of FIG. 6, illustrating the thermal expanding member being moved toward an expanded position such that a positive pressure differential is produced for directing the additive from the metering valve device through a second one-way valve into a flow path of the filter.
Figure 8:
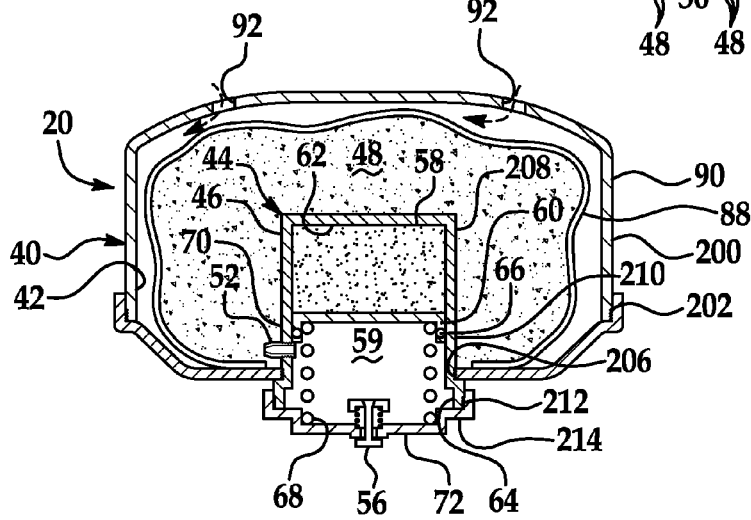
FIG. 8 is a cross-sectional view of the additive dispensing device of FIG. 7, illustrating the second one-way valve being moved toward a closed position.

Exemplary embodiments of the present invention include an additive dispensing device configured to dispense an additive into a flow path in a filter, in response to a temperature of a fluid (e.g., motor oil, fuel, coolant, etc.) passing through the filter. Although an exemplary embodiment is directed to an oil filter other contemplated embodiments include fuel filters, coolant filters or any other filter located in a system wherein the fluid being filtered is heated during fluid flow and cooled during a stagnate or inactive state wherein a thermally expanding member is used to disperse the additive. In yet another alternative it is contemplated that the thermally expanding member is capable of dispersing an additive wherein the fluid being filtered is cooled during fluid flow and heated or warmer during a stagnate or inactive state wherein a thermally expanding member is used to disperse the additive. In these embodiments, the additive dispensing device is a component of a thermally activated additive dispensing filter that separates the supply of additive from the flow path of motor oil. In particular, the filter described herein has a reservoir in fluid communication with a metering device by a first one-way valve. Further, the metering device is in fluid communication with a flow path in a housing of the filter by a second one-way valve. The reservoir contains the supply of additive, and the first and second one-way valves are alternatingly opened, such that the supply of additive is isolated from the flow path of motor oil.

Throughout the present specification, relative positional terms like 'upper', 'lower', 'top', 'bottom', 'horizontal', 'vertical', and the like are used to refer to the filter and components in the orientation thereof shown in the drawings. These terms are used in the illustrative sense to describe the depicted embodiments, and are not meant to be limitative. It will be understood that in a particular application thereof, a filter may be installed on an engine in an orientation different from that shown in the drawings, such as inverted 180 degrees or transverse to that shown, and in such a case, the above-identified relative positional terms will no longer be accurate.

Referring to FIGS. 1-8, there is shown a thermally activated additive dispensing filter 10 ("filter") having an additive dispensing device 20 in accordance with an exemplary embodiment of the present invention. The filter has a flow path 12 that is configured to pass motor oil therethrough. It is contemplated that the filter 10 can be used for filtering a variety of other suitable fluids.

The filter generally includes a hollow cylindrical housing 14 having a hollow chamber 16, a filtration media 18 within the chamber, and the additive dispensing device disposed coaxially adjacent to the filtration media. It is understood that the additive dispensing device can be located in a variety of other suitable positions in the housing.

The housing is formed from a hollow, generally cylindrical case 22, and a base plate 24 sealingly attached to the case.

A foraminous center tube 26 may, optionally, be provided within the housing to supportively reinforce the filtration media 18 thereon.

An anti-drainback valve 28 is provided inside the housing, at the base of the center tube, to keep oil in the filter during engine shutoff. In accordance with an exemplary embodiment of the present invention the anti-drainback valve is a flexible resilient member capable of being deflected inwardly as fluid is flowing into the filter and then returns to a closed state illustrated in FIG. 2 when fluid is not flowing into the filter. In other words, when fluid is flowing in the filter through opening 32 and as illustrated by the directional arrows the pliable member of anti-drainback valve 28 is pushed away from openings 32 so fluid can enter the filter.

The filter may incorporate a spring-loaded pressure relief valve of a type known to those in the art. A retainer 30 may be provided above the additive dispensing device 20 to exert a downward pressure thereon and against the center tube.

The base plate includes a plurality of inlet ports 32 that are arranged in a circular pattern. The base plate also includes a threaded central outlet port 34 formed therein, to allow rotatable mounting of the filter on an externally threaded tubular fitting on an engine block (not shown). An annular external seal or gasket 36 fits engagingly into a groove 38 formed at the bottom surface of the base plate, to resist oil leakage outwardly from the base of the filter.

In this non-limiting exemplary embodiment, the filtration media includes a conventional cylindrical member made of accordion-pleated filter paper. It is contemplated that the filter media can instead have various other constructions formed from other suitable materials.

The additive dispensing device has an outer shell 40 defining an inner area 42 for housing a reservoir and an inner shell 44 defining a portion of the metering valve device 46 which is partially disposed inside the reservoir disposed in the inner area. The reservoir contains a beneficial additive and the beneficial additive is in fluid communication with a one way valve. It is contemplated that the metering valve device can instead be located adjacent and external to the reservoir rather than inside the reservoir. It will be appreciated that the metering valve device can be located in various suitable other positions within the housing.

The reservoir contains a supply of an additive 48 in liquid or semi-liquid form for being released into the flow path in the housing. In accordance with an exemplary embodiment of the present invention the additive may be any one of a detergent or dispersant additive that is configured to suspend minute particles of soot in the oil, such that in one embodiment the oil carries the soot particles to the filter for removal from the oil. Alternatively, the dispersant is used to keep the soot in suspension in the oil so that it doesn't agglomerate and fall out of suspension accumulating on surfaces and potentially causing wear or plugging issues. Other contemplated beneficial additives are basic conditioners, corrosion inhibitors, metal deactivators, antioxidants, friction modifiers, oil stabilizers, pour point depressants, viscosity index improvers, anti-wear agents, extreme pressure additives, alkaline additives, and combinations of the foregoing.

In one non-limiting exemplary embodiment, the additive becomes more viscous as the temperature of the fluids through the filter increases and thus the temperature of the additive increases.

As detailed below, the reservoir is in fluid communication with the metering valve device by a first one-way valve 52 such that additive is only drawn into the metering valve device via the first one-way valve. Moreover, the metering valve device is only in fluid communication with an interior area 54 of the filtration media by a second one-way valve 56, for dispensing additive into a portion of the flow path, which flows directly to the central outlet port without passing through the filtration media. The first one-way valve being configured to only draw additive into a dispensing chamber of the metering device and the second one-way valve being configured to expel of dispense additive out of the dispensing chamber of the metering device. Further, as explained in detail below, the first and second one-way valves are alternatingly opened by a thermal expanding member 58, which is located inside the metering valve device. The thermal expanding member changes size in response to temperature. In accordance with an exemplary embodiment of the present invention, the thermal expanding member is a structural component or gel or liquid or a combination of the foregoing that expands to a first state in response to a temperature change and contracts to an unexpanded state when the temperature changes back to an initial temperature range.

In one non-limiting exemplary embodiment, the thermal expanding member may be formed in a variety of shapes and from a variety of materials. For example, one non-limiting material for the thermal expanding member would be a wax or a thermostat wax that is formulated to expand at a predetermined temperature or temperatures, which corresponds approximately to that of the hot oil flowing though the filter such that the hot oil can heat up the thermal expanding member causing it to expand and apply a force and thereafter returning to the un-expanded state after the engine oil and the thermally expanding member cools. One non-limiting example of such a thermally responsive wax is a high vacuum distilled synthetic wax, which exhibit specific expansion behavior at certain temperatures. One non-limiting example of such a wax is commercially available under the ASTORSTAT trademark. Of course, any other suitable candidates are considered to be within the scope of exemplary embodiments of the present invention. Other contemplated thermally expanding members are bimetallic materials configured to expand and contract with changes in temperature.

For typical engine applications, a non-limiting predetermined temperature for expansion of the thermal expanding member would be approximately 120 degrees Fahrenheit and greater, or at some other selected temperature within the normal operating oil temperature range of the engine. For example, the thermally expanding member can be configured to expand in a predetermined temperature range (e.g., 120-220; 180-220; 100-240, etc. degrees Fahrenheit) or any other desired temperature wherein dispersement of the additive is desired. It being understood that the aforementioned temperatures and/or ranges are merely provided as an example and temperatures greater or less than any one of the aforementioned temperatures are considered to be within the scope of exemplary embodiments of the present invention.

The metering valve device has a dispensing chamber 59 and a slidable piston member 60 disposed in the dispensing chamber, the slidable piston member separates the dispensing chamber into a first chamber 62 and a second chamber 64. The slidable piston member is configured to move upward or in a first direction and downward or in a second direction opposite to the first direction such that the pressure in the second chamber decreases and increases, respectively, for directing additive from the reservoir through the metering valve device and into the flow path.

A biasing member or spring 68 is disposed in the second chamber and is configured to move the slidable piston member upward as the thermal expanding member moves toward the contracted position due to a decrease in temperature. Accordingly, the volume of the second chamber increases such that the pressure therein decreases. In this respect, a negative pressure differential is produced between the reservoir and the metering valve device such that a portion of the additive is drawn from the reservoir through the first one-way valve into the second chamber while the second one-way valve remains closed.

The thermal expanding member is a material disposed inside the first chamber that expands and contracts based upon the temperature of the environment it is disposed in. In another alternative exemplary embodiment, the thermal expanding member is contained within a flexible housing that expands and contracts along with the thermally expanding material. The thermal expanding member is configured to be received within the first chamber and move toward the expanded position in response to an increase in temperature, such that the thermal expanding member moves the slidable piston member downward (as viewed in the Figures of course, other orientations are possible, e.g., piston and thermal expanding member moves up or sideways in response to an increase in pressure). Accordingly, the volume of the second chamber is decreased and the pressure therein is increased. In that way, a positive pressure differential is produced between the metering valve device and the interior area, such that the additive is dispensed from the second chamber through the second one-way valve into the flow path while the first one-way valve remains closed.

The thermal expanding member is configured to move the slidable piston member downward (as viewed in the Figures) by expanding in response to an increase of temperature, such as when heated motor oil or other heated fluid flows through the filter while the engine or other device is operating. In accordance with an exemplary embodiment of the present invention the thermally expanding member will apply a force against the piston as the thermally expanding member expands. In addition, the expanding force of the thermal expanding member will overcome the biasing force of the biasing member or spring 68, which is in a direction opposite to the expanding direction of the thermal expanding member.

Conversely, the biasing force of the biasing member moves the slidable piston upward as the thermal expanding member 58 contracts in response to a decrease of temperature, such as after the engine or other device has been turned off and the fluid and the thermally expanding member cools. In one exemplary embodiment, the thermal expanding member is formed from a bimetallic material, an alloy, a metal, a wax material, or a variety of suitable thermal expanding materials, which expand and contract in response to temperature differences. Also, the thermal expanding material may or may not be enclosed in an expandable and contractible outer sheath that also has elastic qualities, which allow the same to expand and then contract to an unexpanded state. Also, the thermal expanding member may occupy all (FIGS. 5-8) or only a portion (FIG. 2) of the first chamber as long as the necessary force is applied to compress biasing member 68 and is capable of being compressed by biasing member 68 when the thermal expanding member cools. A piston ring or O-ring 66 facilitates in providing the pressure gradient and is sandwiched between the slidable piston member 60 and the inner shell 44.

Figure 9:
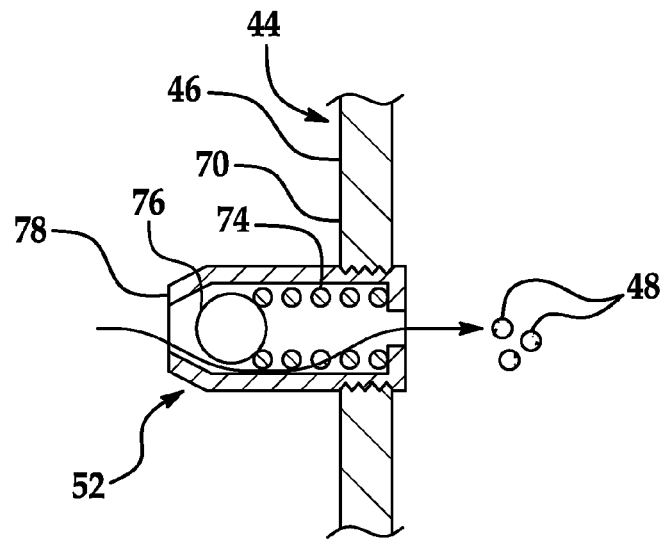
FIG. 9 is an enlarged view of the first one-way valve of FIG. 5, illustrating the first one-way valve being moved toward an open position by the force of the negative pressure differential which is greater than the force of a first biasing member.
Figure 10:
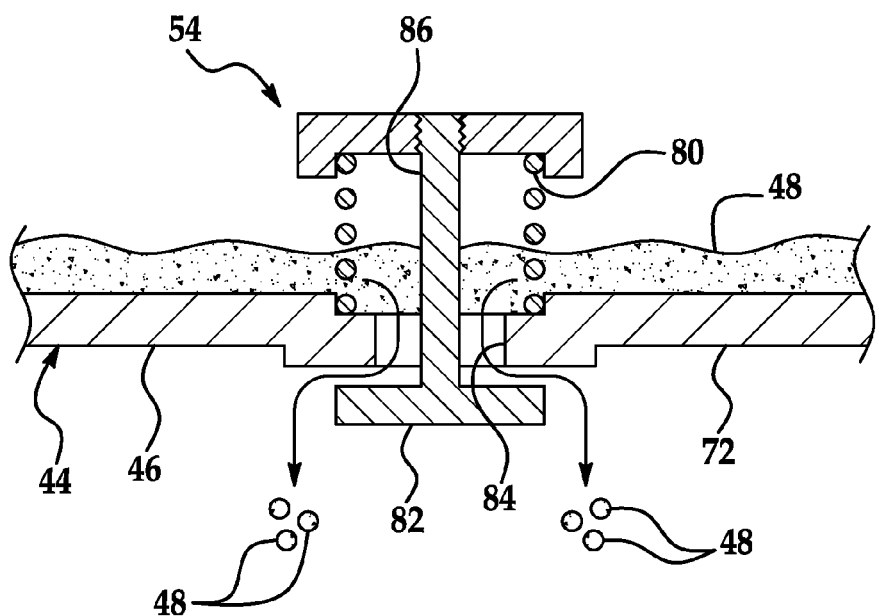
FIG. 10 is an enlarged view of the second one-way valve of FIG. 7, illustrating the second one-way valve being moved toward an open position by the force of the positive pressure differential which is greater than the force of a first biasing member.

As depicted in FIGS. 9 and 10 and in one non-limiting exemplary embodiment, the first and second one-way valves 52, 56 are ball check valves or various other suitable one-way valves. The first one-way valve is disposed in a first wall portion 70 of the second chamber. The first wall portion separates the reservoir and the second chamber of the metering valve device. The second one-way valve is disposed in a second wall portion 72 of the metering valve device. The second wall portion separates the second chamber of the metering valve device and the flow path in the housing of course, other equivalent valve devices are contemplated.

The first one-way valve has a first biasing member or spring 74 configured to move a plug member 76 to a blocking position, such that the plug member blocks an orifice 78 formed in the valve 52. In this respect, a sufficient negative pressure differential between the reservoir and the metering valve device 46 draws the plug member 76 from the blocking position to a non-blocking position away from the orifice 78, such that additive is drawn from the reservoir 42 into the second chamber 64. The first one-way valve is moved toward a closed position when the force associated with the negative pressure differential decreases below the opposing force of the first biasing member, e.g. after additive has been drawn into the metering valve device.

The second one-way valve has a second biasing member or spring 80 configured to move a detent member 82 to a blocking position, such that the detent member blocks a port 84 formed in the second wall portion. In this regard, a sufficient positive pressure differential between the metering valve device and the chamber of the housing moves the detent member from the blocking position to a non-blocking position out and away from the port, such that the additive is moved from the second chamber of the metering valve device into the flow path of the housing. The second one-way valve is moved to the closed position when the force associated with the positive pressure differential decreases below the force of the second biasing member, e.g. after the additive has been forced into the flow path.

An outer shell of the reservoir is defined by a collapsible membrane 88 disposed in an inner area 42 of the outer shell. The collapsible membrane defines a chamber or reservoir for the additive and is sealingly attached to allow this chamber or reservoir to be in fluid communication with the first one-way valve. The collapsible membrane allows the chamber or reservoir of additive to shrink as the additive is drawn into the metering device thus providing ease of transfer from the chamber of the collapsible membrane through the first one-way valve (e.g., a vacuum is not created in the chamber of the collapsible membrane). The collapsible membrane is also disposed in an outer shell 90 of the additive dispensing device. The outer shell has one or more relief ports 92, such that fluid entering the filter is in open fluid communication with an exterior surface of the collapsible membrane and facilitates the collapsible membrane 88 to contract as additive is drawn from the collapsible membrane 88 into the metering valve device. Furthermore, the fluid flowing into the outer shell of the additive dispensing device will transfer heat of the same to the thermally expanding member.

As illustrated in the Figures and in one non-limiting exemplary embodiment, the outer shell of the additive dispersing device is formed into a cup or housing portion 200 with a rim portion 202 threadably engaged to a lid portion 204. The housing forms a container for the reservoir of additive. The lid 204 has a central opening 206 configured to receive the metering valve device. More particularly, the lid 204 is threadably engaged to an outer surface 210 of a cup or housing portion 208 of the metering valve device 46. The cup 208 has a rim portion 212 that is threadably engaged to a lid 214. It is contemplated that the reservoir and the metering valve device can be formed from various other suitable constructions.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the present application.

What is claimed is:

1. A thermally activated additive dispensing filter, comprising:
    a housing defining an inlet opening and an outlet opening, the housing further having a flow path between the inlet opening and the outlet opening, the fluid path being configured to pass a fluid therethrough;
    a filtration media located inside the housing and within the flow path such that a fluid in the flow path must pass through the filtration media;
    an additive dispensing device located inside the housing, the additive dispensing device having a reservoir configured to contain a supply of an additive, the reservoir being in fluid communication with a dispensing chamber of a metering valve device by a first one-way valve, the metering valve device being configured to dispense a portion of the additive from the dispensing chamber into the housing by a second one-way valve; and
    a thermal expanding member disposed in the dispensing chamber, the thermal expanding member being configured to expand and contract between an expanded position and a contracted position in response to temperature, the thermal expanding member decreasing a pressure in the dispensing chamber as the thermal expanding member moves from the expanded position towards the contracted position and additive is drawn from the reservoir into the dispensing chamber through the first one-way valve, and the thermal expanding member increases the pressure in the dispensing chamber as the thermal expanding member moves from the contracted position towards the expanded position and additive previously drawn from the reservoir chamber into the dispensing chamber is dispensed through the second one-way valve; and
    wherein the reservoir is defined by an interior cavity defined by a collapsible membrane that is configured to store the additive, the collapsible membrane being sealingly attached to the first one-way valve such that the interior cavity is in fluid communication with the first one-way valve and an exterior of the collapsible membrane is in open fluid communication with the flow path so that the collapsible membrane collapses as additive is drawn from the interior cavity through the first one-way valve.

2. The thermally activated additive dispensing filter as in claim 1, wherein the metering valve device further comprises a slidable piston member separating the dispensing chamber into a first chamber and a second chamber, the first chamber containing the thermal expanding member.

3. The thermally activated additive dispensing filter as in claim 2, further comprising a biasing member configured to provide a biasing force to the thermal expanding member, the biasing force urging the thermal expanding member towards the contracted position.

4. The thermally activated additive dispensing filter as in claim 2, wherein the thermally expanding member is configured to provide a force to the slidable piston member as the thermal expanding member moves from the contracted position toward the expanded position, the force decreasing the volume of the second chamber.

5. The thermally activated additive dispensing filter as in claim 2, wherein a first wall portion of the second chamber includes the first one-way valve and a second wall portion of the second chamber includes the second one-way valve, the first wall portion being disposed between the reservoir and the second chamber, the second wall portion being disposed between the second chamber and the flow path inside the housing.

6. The thermally activated additive dispensing filter as in claim 5, wherein the first one-way valve includes a plug member being configured to move between a closed position and an open position, a first biasing member being configured to move the plug member from the open position to the closed position with the plug member blocking an orifice in the first wall portion.

7. The thermally activated additive dispensing filter as in claim 5, wherein the second one-way valve includes a detent member being configured to move between a closed position and an open position, a second biasing member being configured to move the detent member from the open position to the closed position with the detent member blocking a port in the second wall portion.

8. The thermally activated additive dispensing filter as in claim 2, wherein a piston ring is sandwiched between the slidable piston member and the metering valve device.

9. The thermally activated additive dispensing filter as in claim 1, wherein the collapsible membrane is located within a container that is in fluid communication with the flow path such that the collapsible membrane collapses as additive is drawn from the interior cavity.

10. The thermally activated additive dispensing filter as in claim 1, wherein the filtration media defines an interior area with the flow path passing through the interior area, the additive dispensing device being configured to dispense the additive into the fluid passing through the interior area and directly to the outlet opening without passing through the filtration media.

11. The thermally activated additive dispensing filter as in claim 10, wherein one end of the filtration media is attached to the housing such that the interior area of the filtration media is in open communication with the outlet opening of the housing, the other end of the filtration media being sealingly attached to the additive dispensing device such that the interior area is in communication with the metering valve device.

12. The thermally activated additive dispensing filter as in claim 1, wherein the metering valve device is located within the reservoir.

13. The thermally activated additive dispensing filter as in claim 1, wherein the thermal expanding member is formed from one of a wax material and a bimetallic material.

14. The thermally activated additive dispensing filter as in claim 1, wherein the second one-way valve includes a detent member being configured to move between a closed position and an open position, a second biasing member being configured to move the detent member from the open position to the closed position with the detent member blocking a port in the second wall portion.

15. An additive dispensing device, comprising:
a housing;
a reservoir defined by an interior cavity of a collapsible membrane located within the housing, the reservoir being configured to contain a supply of an additive, the collapsible membrane being sealingly attached to a first one-way valve such that the interior cavity is in fluid communication with the first one-way valve, the reservoir being in fluid communication with a dispensing chamber of a metering valve device by a first one-way valve, the metering valve device being configured to dispense a portion of the additive from the dispensing chamber into a housing by a second one-way valve; and
a thermal expanding member disposed in the dispensing chamber, the thermal expanding member being configured to expand and contract between an expanded position and a contracted position in response to temperature, the thermal expanding member decreasing a pressure in the dispensing chamber as the thermal expanding member moves from the expanded position towards the contracted position and additive is drawn from the interior cavity of the reservoir into the dispensing chamber through the first one-way valve, the thermal expanding member increasing the pressure in the dispensing chamber as the thermal expanding member moves from the contracted position towards the expanded position and additive previously drawn from the reservoir chamber into the dispensing chamber is dispensed through the second one-way valve;
wherein the metering valve device has a slidable piston member separating the dispensing chamber into a first chamber and a second chamber, the first chamber containing the thermal expanding member; and
wherein the collapsible membrane collapses within the housing as the additive is drawn out of the reservoir.

16. The additive dispensing device as in claim 15, further comprising a biasing member configured to provide a biasing force to the thermal expanding member, the biasing force urging the thermal expanding member toward the contracted position.

17. The additive dispensing device as in claim 15, wherein the thermally expanding member is configured to provide a force to the slidable piston member as the thermal expanding member moves from the contracted position toward the expanded position, the force decreasing the volume of the second chamber and wherein the housing has a plurality of openings that allow for fluid to be received in the housing as the collapsible membrane collapses.

18. A method of dispensing an additive into liquid passing through a filter media, comprising:
drawing a first amount of additive into a dispensing chamber through a first one way valve by contracting a thermally expanding member, from an expanded position to a contracted position, wherein the first one way valve is in fluid communication with an interior of a collapsible membrane that defines a reservoir for holding the additive; and
dispensing the first amount of additive from the dispensing chamber through a second one way valve by expanding the thermally expanding member from the contracted position to the expanded position by exposing the thermally expanding member to a fluid having a temperature higher than a temperature that causes the thermally expanding member to be in a contracted position; and
contacting the liquid passing through a filter media with the additive.

19. The method as in claim 18, wherein the collapsible membrane is located within a housing and the collapsible membrane collapses within the housing as the additive is drawn from the reservoir.

* * * * *